United States Patent
Hirai et al.

(10) Patent No.: US 8,032,869 B2
(45) Date of Patent: Oct. 4, 2011

(54) PROFILING METHOD AND COMPUTER PRODUCT

(75) Inventors: Akira Hirai, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1220 days.

(21) Appl. No.: 11/493,564

(22) Filed: Jul. 27, 2006

(65) Prior Publication Data

US 2007/0234298 A1 Oct. 4, 2007

(30) Foreign Application Priority Data

Mar. 31, 2006 (JP) ................................. 2006-099350

(51) Int. Cl.
G06F 9/44 (2006.01)
G06F 9/45 (2006.01)
G06F 17/40 (2006.01)

(52) U.S. Cl. ......... 717/130; 717/124; 717/158; 702/187
(58) Field of Classification Search .......................... None
See application file for complete search history.

(56) References Cited

U.S. PATENT DOCUMENTS

| | | | |
|---|---|---|---|
| 6,334,210 B1 * | 12/2001 | Miura et al. ................... | 717/128 |
| 2004/0260913 A1 * | 12/2004 | Babu et al. .................... | 712/220 |
| 2006/0075386 A1 * | 4/2006 | Loh et al. ...................... | 717/124 |
| 2007/0185688 A1 * | 8/2007 | Yamamura et al. ........... | 702/186 |
| 2007/0234299 A1 * | 10/2007 | Watanabe ..................... | 717/124 |
| 2010/0077388 A1 * | 3/2010 | Kimura ......................... | 717/158 |

FOREIGN PATENT DOCUMENTS

| | | |
|---|---|---|
| JP | 01-270153 A | 10/1989 |
| JP | 03-058144 A | 3/1991 |
| JP | 11-212837 | 8/1999 |
| JP | 2003-140928 | 5/2003 |

OTHER PUBLICATIONS

"O profile—A System Profiler for Linux", [retrieved on Mar. 18, 2006], Internet, <URL: http://sourceforge.net/projects/oprofile>.
"Intel VTune Performance Analyzer", [retrieved on Mar. 18, 2006], Internet, <URL: http://www.intel.com/cd/software/products/ijkk/jpn/vtune/index.htm>.
JPO, Office Action mailed Aug. 3, 2010, in connection with correspondent JP patent application No. 2006-099350. English-language translation.

* cited by examiner

*Primary Examiner* — Michael J Yigdall
*Assistant Examiner* — Ben Wang
(74) *Attorney, Agent, or Firm* — Fujitsu Patent Center

(57) ABSTRACT

Information on an execution status of an information-collection target program is collected with an interrupt handler that is activated by an interrupt generated when a predetermined condition is satisfied. A target range for collecting the information with the interrupt handler is specified, and information to be collected by the interrupt handler when the interrupt is generated within the specified target range is set.

20 Claims, 10 Drawing Sheets

FIG.2

| TARGET NUMBER | START ADDRESS | END ADDRESS | FLAG VALUE |
|---|---|---|---|
| 0 | 1000 | 2000 | 1 |
| ⋮ | ⋮ | ⋮ | ⋮ |

FIG.3

| EXECUTION ADDRESS AT INTERRUPT TIME | FLAG VALUE |
|---|---|
| 1200 | 1 |
| ⋮ | ⋮ |

FIG.7

| TRANSITION SOURCE ADDRESS | TRANSITION DESTINATION ADDRESS | TARGET NUMBER | TRANSITION IDENTIFICATION VALUE |
|---|---|---|---|
| 500 | 100 | 0 | 0 |
| ⋮ | ⋮ | ⋮ | ⋮ |

PROFILING METHOD AND COMPUTER PRODUCT

CROSS-REFERENCE TO RELATED APPLICATION

This application is based upon and claims the benefit of priority of the prior Japanese Patent Application No. 2006-099350, filed on Mar. 31, 2006, the entire contents of which are incorporated herein by reference.

BACKGROUND OF THE INVENTION

1. Field of the Invention

The present invention relates to a technology for collecting information on an execution status of a program using an interrupt handler that is activated by an interrupt generated when a predetermined condition is satisfied.

2. Description of the Related Art

Profiling techniques are widely used in computer systems to analyze and optimize performance. Profiling is effective in analysis of tracking frequency and time distribution of a target program code, call relationship frequency within the program, and the like. Conventionally, there are two types of profiling techniques.

One technique uses a method of inserting a code for profiling into a compiler and extracting execution information (see FIG. 10A). This profiling technique is most widely used, and is included as a standard function in compiler products. Several methods for improving efficiency of data extraction using this technique have been proposed (see, for example, Japanese Patent Application Laid-Open No. H11-212837 and Japanese Patent Application Laid-Open No. 2003-140928).

Another profiling technique is a sampling method using a hardware timer and a central processing unit (CPU) performance monitoring function (see FIG. 10B). In this technique, a sampling interrupt is generated at regular periods or every time the measurable number of commands executed by a processor and its peripheral circuits, the number of cache misses, and the like, reaches a fixed number. A code range that has statistically consumed most time, a code range that has been executed most frequently, and the like, are extracted by registering an executed command address and the like when an interrupt is generated by a profiling processing program that is registered as an interrupt process.

However, the former technique of inserting a profiling code into a compiler has problems of creating a temporal overhead due to additional profiling processing to the overall target code, or of creating dynamic disparity or memory layout disparity with the original program binary due to the insertion of the code. Differences with the original operation are particularly common in programs where the timing of communications and the like is important, and use of this method is limited depending on required precision.

Although the latter profiling technique using sampling can minimize these problems of overhead and memory layout since it does not require alteration of the target code, it cannot acquire a path to the execution command address and its call relationship with the program at the time of sampling. For example, if a library function A has the longest execution time, there are normally plural codes for calling the library function A, and a code section can also be called from a plurality of sources. According to this technique, there is no method of efficiently acquiring detailed operation information relating to such call sources, dependency relationships, and the like.

SUMMARY OF THE INVENTION

It is an object of the present invention to at least partially solve the problems in the conventional technology.

A computer-readable recording medium according to one aspect of the present invention stores therein a computer program for collecting information on an execution status of an information-collection target program with an interrupt handler that is activated by an interrupt generated when a predetermined condition is satisfied. The computer program causes a computer to execute specifying a target range for collecting the information with the interrupt handler; and setting information to be collected by the interrupt handler when the interrupt is generated within the target range specified at the specifying.

A profiling method according to another aspect of the present invention is for collecting information on an execution status of an information-collection target program with an interrupt handler that is activated by an interrupt generated when a predetermined condition is satisfied. The method includes specifying a target range for collecting the information with the interrupt handler; and setting information to be collected by the interrupt handler when the interrupt is generated within the target range specified at the specifying.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a flag-management table;

FIG. 3 is an example of an interrupt-handler-record table;

FIG. 7 is an example of a transition-management table;

DETAILED DESCRIPTION OF THE PREFERRED EMBODIMENTS

Exemplary embodiments of the present invention will be explained in detail below with reference to the accompanying drawings.

Figure 1:
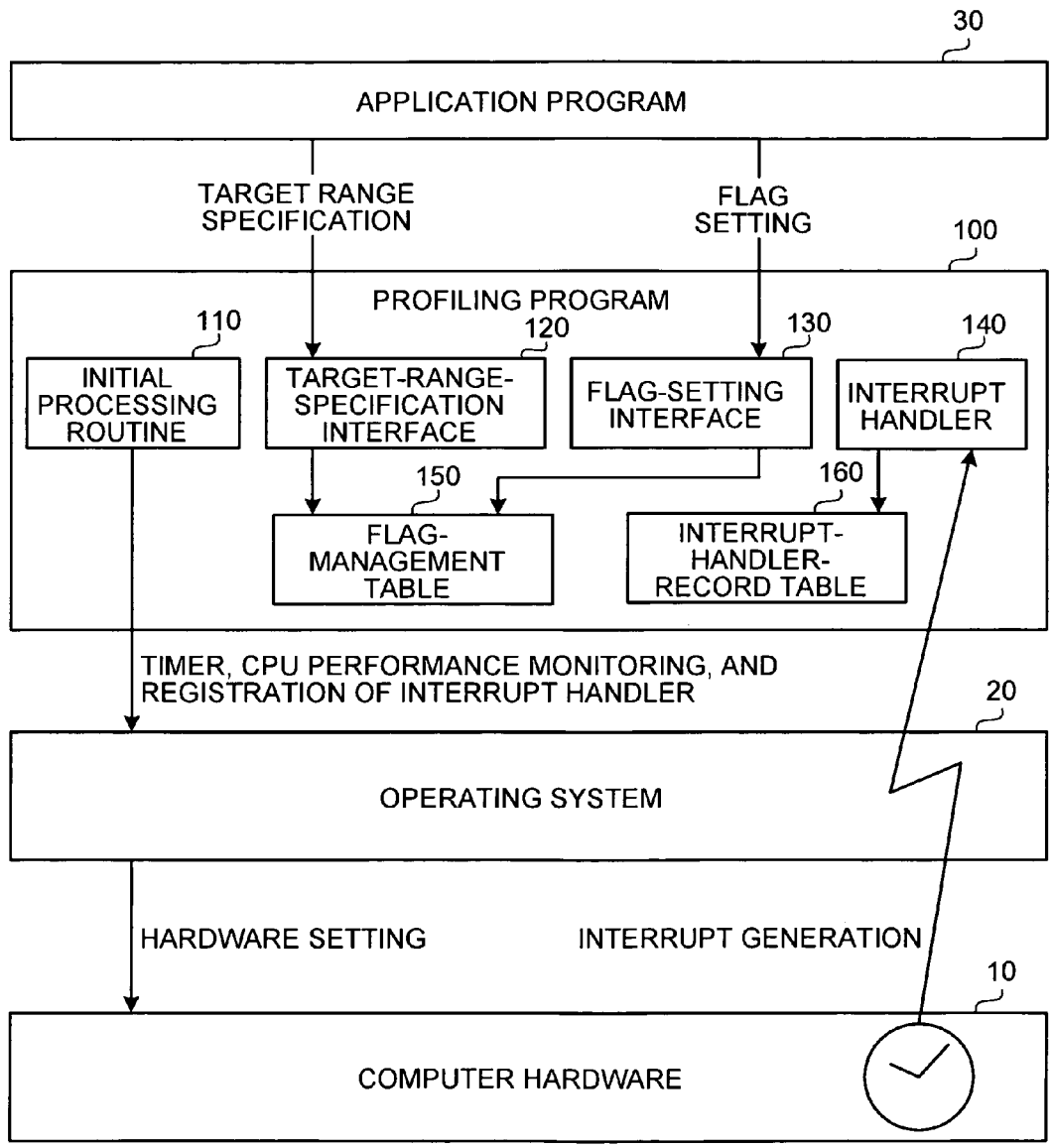
FIG. 1 is a schematic of a profiling system according to a first embodiment of the present invention.

FIG. 1 is a schematic of a profiling system according to a first embodiment of the present invention. In the profiling system according to the first embodiment, a computer hardware 10, an operating system 20, an application program 30, and a profiling program 100 are linked to operate and collect information.

The computer hardware 10 t executes programs, including the profiling program 100. When a condition set by the operating system 20 is satisfied, that is, when an event specified by the operating system 20 occurs, the computer hardware 10 generates an interrupt and executes an interrupt process program registered in advance.

The operating system 20 monitors resources of the computer hardware 10, controls execution of the application program 30, sets interrupt-generating events for the computer hardware 10, and the like.

The application program 30 is a target program from which information is collected, and executes processing necessary for collecting information by calling a library function by an application program interface (API) provided by the profiling program 100.

The profiling program 100 collects information relating to the application program 30, and includes an initial processing routine 110, a target-range-specification interface 120, a flag-setting interface 130, an interrupt handler 140, a flag-management table 150, and an interrupt-handler-record table 160.

The initial processing routine 110 makes a request, such as a request to set a timer that generates sampling interrupts and a request to register the interrupt handler 140 activated when a sampling interrupt is generated, to the operating system 20. In addition to a predetermined time elapsing on the timer, other events for which a CPU performance monitoring mechanism generates an interrupt can be set as sampling interrupt-generating events, such as a fixed number of executed commands and a fixed number of accesses to a specific address.

The target-range-specification interface 120 is a library function that receives a target address, a function name, and a label appended to an execution code, as an argument from the application program 30, registers the information-collection target range in the flag-management table 150, and provides an API used by the application program 30 in specifying the target range.

When a function name or a label appended to the execution code is specified as a target range for collecting information, the target-range-specification interface 120 acquires a start address and an end address of the function (or a function containing the label) from the operating system 20 and the application program 30, and registers it in the flag-management table 150.

The flag-setting interface 130 is a library function that receives a flag value as an argument from the application program 30, sets a flag value for the information-collection target range, and provides an API used by the application program 30 in specifying the flag value.

A flag is a variable number collected by the interrupt handler 140 when the interrupt handler 140 is activated within the information-collection target range. A plurality of values can be set as flag values.

The flag-setting interface 130 receives a flag value as an argument from the application program 30 and sets a flag value for the information-collection target range, thereby collecting various pieces of information relating to the execution status of the application program 30.

The interrupt handler 140 is an interrupt processing program that is activated by a sampling interrupt from the timer or a sampling interrupt from the CPU performance monitoring mechanism, and stores the execution address at the time when the interrupt is generated in the interrupt-handler-record table 160. When the interrupt handler 140 is activated within the information-collection target range registered in the flag-management table 150, in addition to the execution address at the time when the interrupt is generated, it also stores a flag value in the interrupt-handler-record table 160.

The flag-management table 150 stores information relating to information collection of the application program 30. FIG. 2 is an example of the flag-management table 150.

As shown in FIG. 2, for each information-collection target range of the application program 30, the flag-management table 150 stores a target number for identifying the target range, a start address of the target range, an end address of the target range, and a flag value.

For example, the information-collection target range with a target number of "0" has a start address of "1000" and an end address of "2000". When the interrupt handler 140 is activated within the target range, "1" is collected by the interrupt handler 140 as information indicating the execution status.

The interrupt-handler-record table 160 stores information collected by the interrupt handler 140 upon being activated by a sampling interrupt.

FIG. 3 is an example of the interrupt-handler-record table 160. As shown in FIG. 3, the interrupt-handler-record table 160 stores an execution address at an interrupt time as an execution address of the application program 30 at the time when the sampling interrupt is generated, and a flag value that is recorded when the execution address at an interrupt time is within the information-collection target range.

For example, when the execution address of the application program 30 at the time when the sampling interrupt is generated is "1200", if the information-collection target range shown in FIG. 2 is registered in the flag-management table 150, the execution address at an interrupt time is within the information-collection target range, and therefore, the interrupt-handler-record table 160 stores the execution address "1200" and a flag value of "1".

Figure 4:
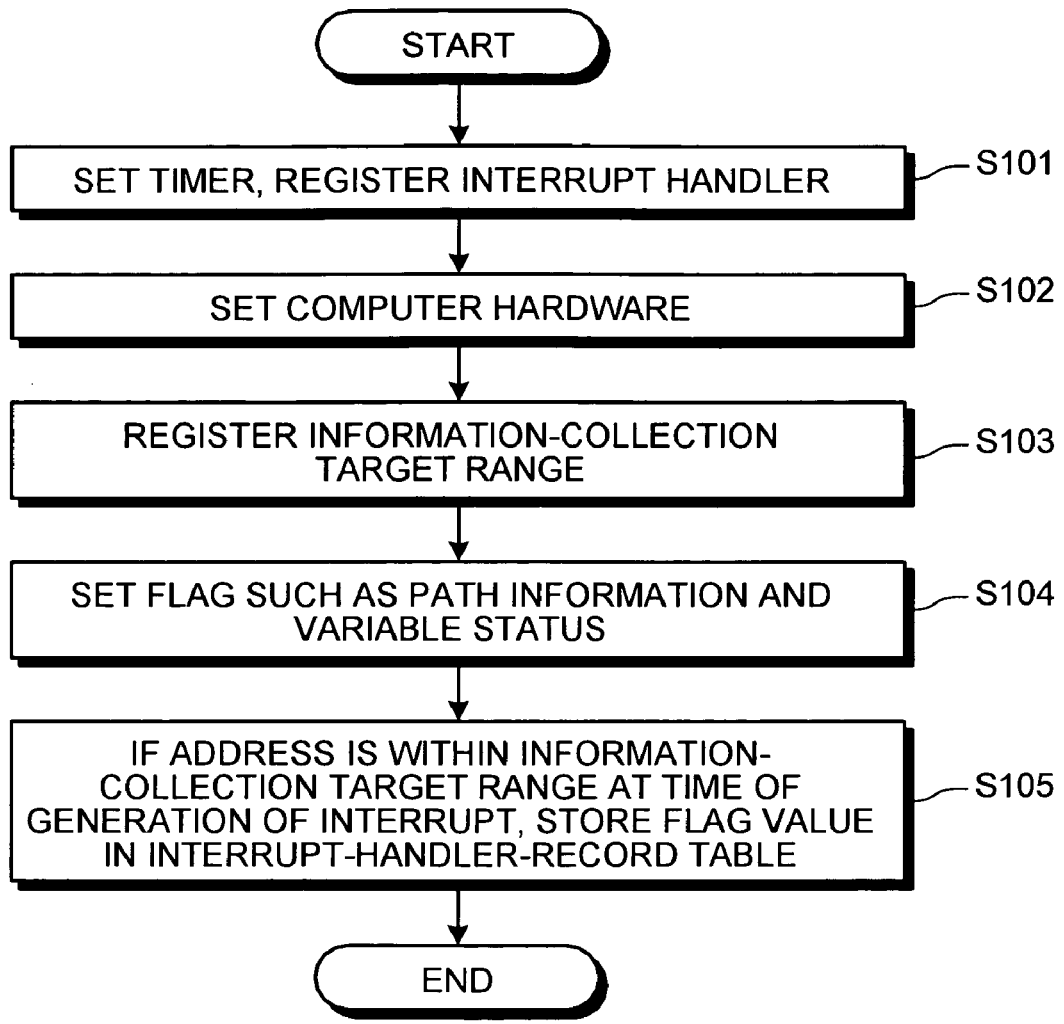
FIG. 4 is a flowchart of a process procedure performed by the profiling system according to the first embodiment.

FIG. 4 is a flowchart of a process procedure performed by the profiling system according to the first embodiment. As shown in FIG. 4, in this profiling system, the initial processing routine 110 of the profiling program 100 requests the operating system 20 to make a setting relating to a sampling interrupt-generating event such as a timer setting, and to register the interrupt handler 140 (step S101).

The operating system 20 performs setting necessary for generating the sampling interrupt such as a timer setting in the computer hardware 10 (step S102). Consequently, a sampling interrupt is generated at regular fixed periods, each time a fixed number of CPU events occur, or the like, thereby calling the interrupt handler 140.

When the application program 30 calls the target-range-specification interface 120 embedded by a user, the target-range-specification interface 120 registers information relating to the information-collection target range in the flag-management table 150 and replies with a target number (step S103).

When the application program 30 calls the flag-setting interface 130 embedded by the user to set a flag such as path information and variable status, the flag-setting interface 130 stores the flag value in the flag-management table 150 (step S104). The user specifies the information collection range that is the target of the flag value by using the target number.

When the interrupt handler 140 is activated by a timer interrupt or the like, the interrupt handler 140 stores the execution address at an interrupt time in the interrupt-handler-record table 160, and, if that address is within the information-collection target range, also stores the flag value (step S105).

Thus the flag-setting interface 130 stores the flag value in the flag-management table 150, and, if the execution address at an interrupt time is within the information-collection target range, the interrupt handler 140 stores the flag value in the interrupt-handler-record table 160, thereby collecting detailed information such as path information and variable status set to that flag value.

Figure 5:
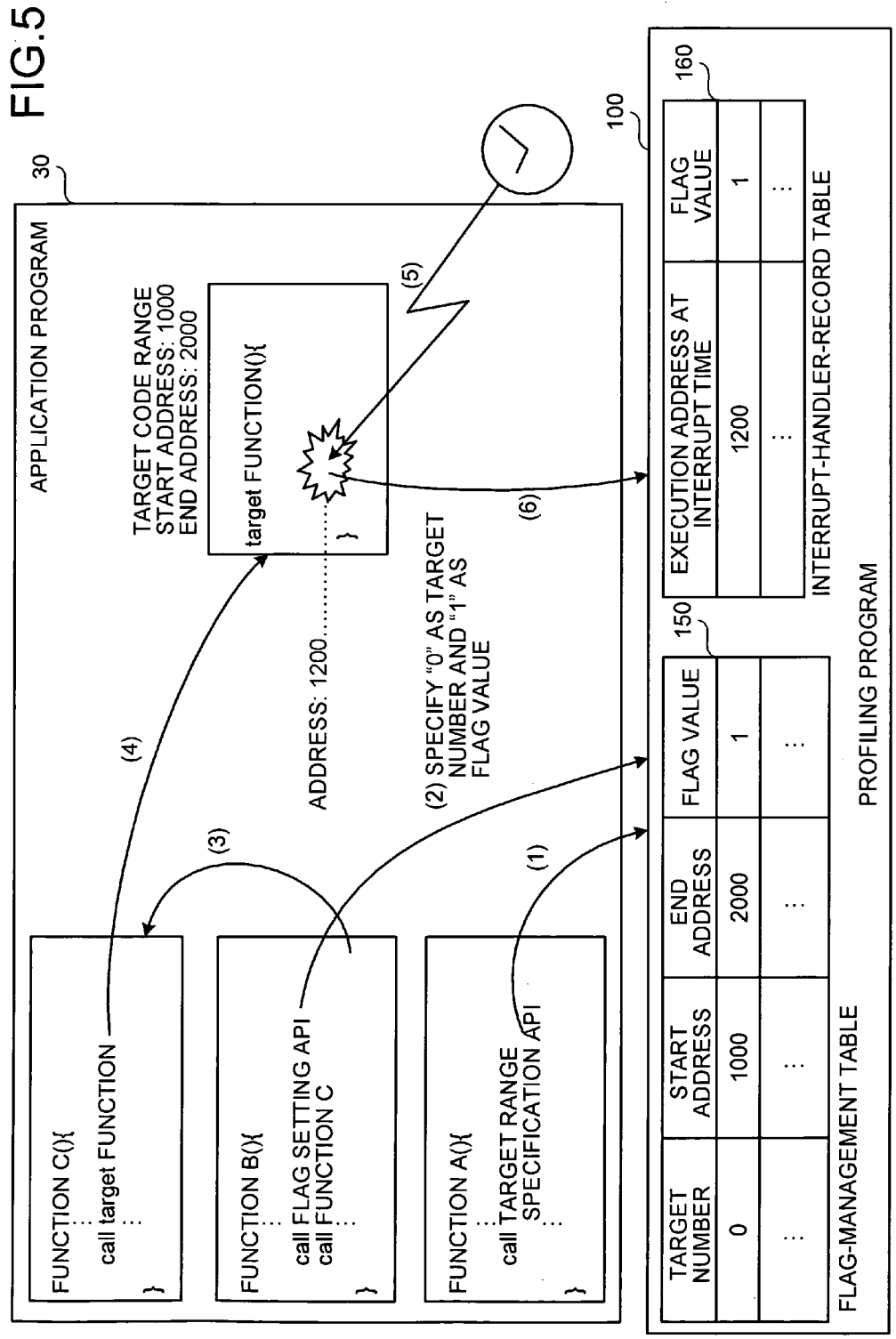
FIG. 5 is a schematic for illustrating an example of an operation of a profiling program according to the first embodiment.

FIG. 5 is a schematic for illustrating an example of an operation of the profiling program 100 according to the first embodiment. As shown in FIG. 5, when the application program 30 specifies an information-collection target range by an API provided by the target-range-specification interface 120 when executing a function A, the target-range-specification interface 120 sets a start address and an end address in the flag-management table 150 (1).

As shown specifically in FIG. 5, the target-range-specification interface 120 sets numbers appended in an ascending order from "0" as the target numbers, and sets a start address "1000" and an end address "2000" of the target range (addresses of target function ( )) as the start address and the end address.

In executing the function B, when the application program 30 specifies a flag value of "1" by the API provided by the flag-setting interface 130, the flag-setting interface 130 stores the flag value "1" in the flag-management table 150 (2).

The application program 30 then calls a function C (3), calls a target function from the function C, and executes the target function that is within the information-collection target range. If a sampling interrupt is generated during the execution of this target function (5), the interrupt handler 140 of the profiling program 100 is called.

The interrupt handler 140 stores the execution address at an interrupt time in the interrupt-handler-record table 160, and determines whether that address is within the address range set in the flag-management table 150. Since in this example, the address is within the address range set in the flag-management table 150, the corresponding flag value is also recorded (6).

In this example, since the execution address at an interrupt time is "1200", the interrupt handler 140 stores "1200" as the execution address at an interrupt time of the interrupt-handler-record table 160, and determines whether that address is within the range from the start address to the end address of the flag-management table 150. Since the execution address "1200" is within the range from the start address "1000" to the end address "2000", the interrupt handler 140 stores "1" as the flag value in the interrupt-handler-record table 160, "1" being the value recorded as the flag value in the flag-management table 150 at that point.

Since the interrupt handler 140 stores the flag value recorded in the flag-management table 150 at that point in the interrupt-handler-record table 160, other information in addition to the execution address can be collected.

As described above according to the first embodiment, the target-range-specification interface 120 receives a specification for an information-collection target range from the application program 30 and registers it in the flag-management table 150. The flag-setting interface 130 receives a flag value from the application program 30 and sets it in the flag-management table 150, and when the execution address at an interrupt time corresponds to one of the information-collection target ranges registered in the flag-management table 150, the interrupt handler 140 stores the execution address, together with the flag value recorded in the flag-management table 150 at that point, in the interrupt-handler-record table 160. Therefore, by setting path information and variable values as the flag values, detailed information relating to the execution status can be collected.

According to the first embodiment, an example in which the user sets a flag value with the application program 30 by an API provided by the flag-setting interface 130 is explained.

However, it may be burdensome for the user to set a flag value with the application program 30 in some cases. A profiling program that can collect path information without setting of the flag value by the user is explained in a second embodiment of the present invention.

Figure 6:
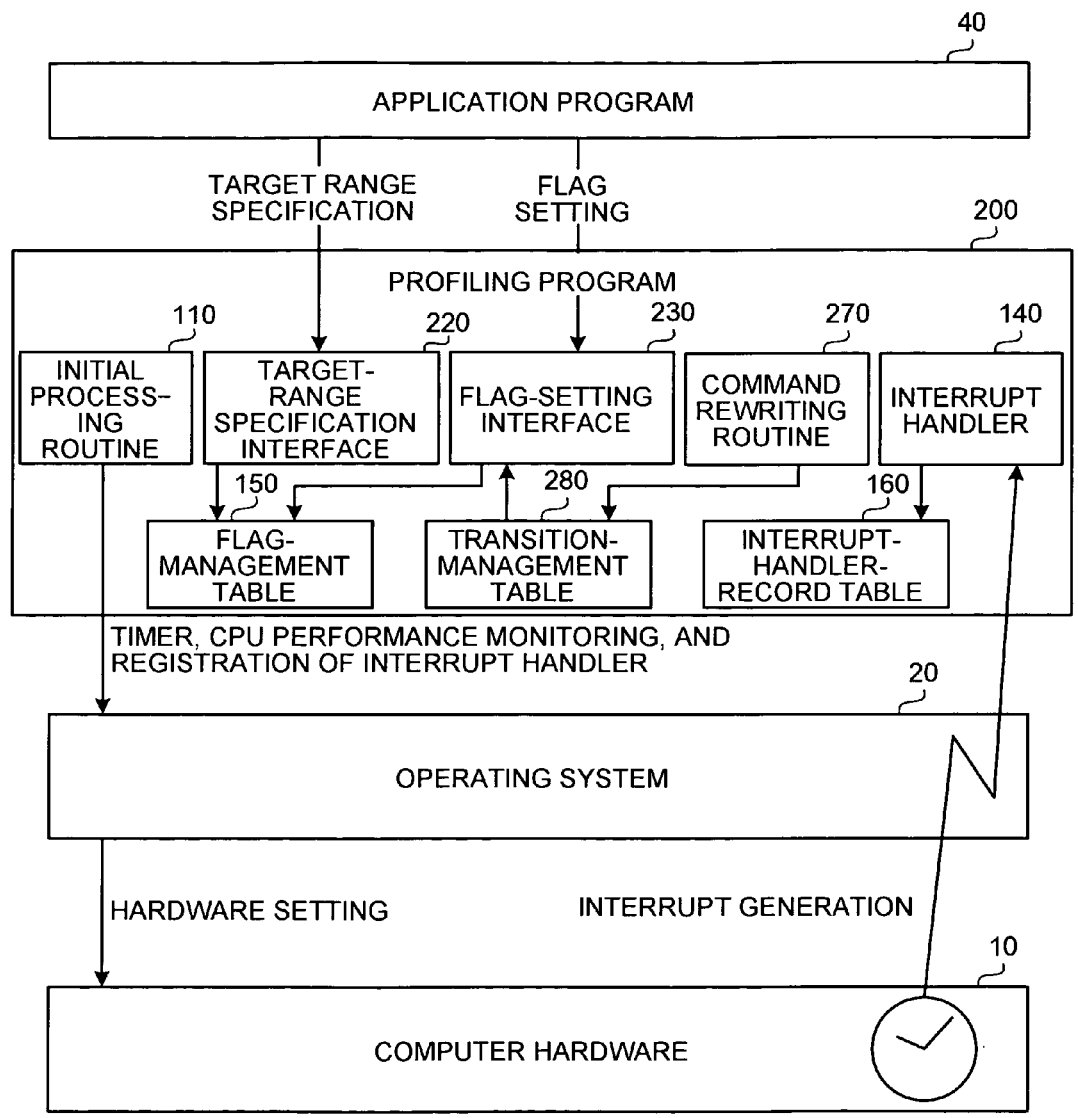
FIG. 6 is a schematic of a profiling system according to a second embodiment of the present invention.

FIG. 6 is a schematic of a profiling system according to the second embodiment. As shown in FIG. 6, in the profiling system according to the second embodiment, the profiling program 100 of the profiling system shown in FIG. 1 is replaced with a profiling program 200, and the application program 30 is replaced with an application program 40, these operating together to collect information. For sake of convenience, like reference numerals denote like parts that perform the same functions as those shown in FIG. 1, and no further explanation is given.

While the application program 40 is similar to the application program 30 in being the target of information collection, the application program 40 does not use an API provided by the flag-setting interface. That is, the user need not set a flag value for collecting information.

The profiling program 200 collects information relating to the execution status of the application program 40, and includes the initial processing routine 110, a target-range-specification interface 220, a flag-setting interface 230, the interrupt handler 140, the flag-management table 150, the interrupt-handler-record table 160, a command rewriting routine 270, and a transition-management table 280.

The command rewriting routine 270 is a processor that, when the target-range-specification interface 220 registers a new information-collection target range in the flag-management table 150, analyzes the application program 40, extracts a command that is transited to the information-collection target range, and rewrites the command such that it calls the flag-setting interface 130.

The command rewriting routine 270 also sets a transition source address, a transition destination address, a transition identification value for identifying a transition, and a corresponding target number in the flag-management table 150, as information relating to an execution transition in the transition-management table 280. It is assumed that the number of stages transited to the information-collection target range can be specified when extracting and rewriting a transition command.

The transition-management table 280 stores information relating to execution transition in the application program 40. FIG. 7 is an example of the transition-management table 280. As shown in FIG. 7, the transition-management table 280 stores transition source addresses, transition destination addresses, target numbers, and transition identification values.

For example, for a transition having a transition identification value of "0", the target number of the corresponding information-collection target range is "0", the transition source address is "500", and the transition destination address is "100".

While the target-range-specification interface 220 is similar to the target-range-specification interface 120 in being a library function that registers an information-collection target range in the flag-management table 150, after registering an information-collection target range, it calls the command rewriting routine 270.

The flag-setting interface 230 obtains a target number from a call source address (transition source address) by the transition-management table 280, and registers a transition identification value as the flag value of that target value in the flag-management table 150. After setting the flag value, the flag-setting interface 230 transfers the execution address to the transition destination address.

Figure 8:
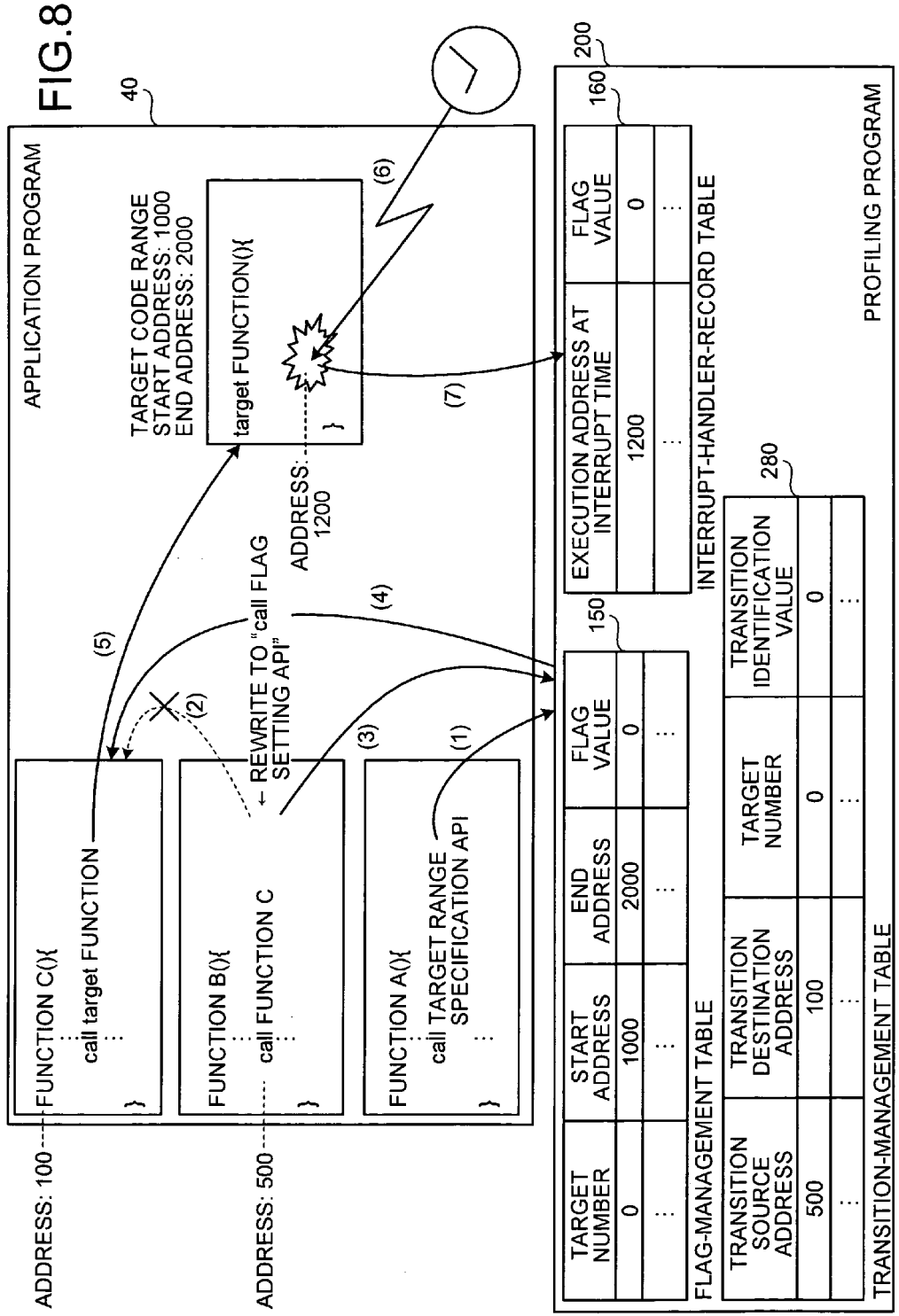
FIG. 8 is a schematic for illustrating an example of an operation of a profiling program according to the second embodiment.

FIG. 8 is a schematic for illustrating an example of an operation of the profiling program 200 according to the second embodiment. As shown in FIG. 8, when the application program 40 specifies an information-collection target range by an API provided by the target-range-specification interface 220 at the time of executing a function A, the target-range-specification interface 220 sets a start address and an end address in the flag-management table 150 (1).

As shown specifically in FIG. 8, the target-range-specification interface 220 sets numbers appended in an ascending order from "0" as the target numbers, and sets a start address "1000" and an end address "2000" of the target range (addresses of target function( )) as the start address and the end address.

The command rewriting routine 270 analyzes the application program 40, extracts a command that is transited to the information-collection target range, and rewrites the command such as to call the flag-setting interface 230 of the profiling program 200. The command rewriting routine 270 also sets a transition source address, a transition destination address, a transition identification value, and a target number of the information-collection target range set in the flag-management table 150 in the transition-management table 280 (2). In the example shown in FIG. 8, the target of rewriting is a transition of two stages earlier to the information-collection target range. The number of stages can be specified arbitrarily.

Specifically, the transition source address is command address "500" of "call function C", the transition destination address is head command address "100" of "function C", and the target number is the corresponding range "0" in the flag-management table 150. A transition identifier is an appended number ascending from "0".

When executing the function B, the application program 40 uses the rewritten command to call the flag-setting interface 230 (3). The flag-setting interface 230 obtains a target number from the call source address (transition source address) by referring to the transition-management table 280, and registers the transition identification value in the flag value of this target number in the flag-management table 150. The execution address is then transferred to the transition destination address (4).

Since the call source address is "500", the application program 40 obtains a target number of "0" that corresponds to the transition source address "500" in the transition-management table 280, and stores a transition identification value of "0" as the flag value of the target number "0" in the flag-management table 150. The application program 40 then obtains a transition destination address of "100" from the transition-management table 280 and transfers the execution address.

The application program 40 then transits to the target function that constitutes the information-collection target range (5). If a sampling interrupt is generated during the execution of this target function (6), the interrupt handler 140 of the profiling program 200 is called (7).

The interrupt handler 140 stores the execution address at an interrupt time in the interrupt-handler-record table 160, and, if that address is within the address range set in the flag-management table 150, also stores the corresponding flag value. In this example, the execution address is "1200".

The interrupt handler 140 stores "1200" as the execution address in the interrupt-handler-record table 160, and determines whether that address is in the range between the start address and the end address of the flag-management table 150. In this example, since the start address is "1000", and the end address is "2000", a flag value of "0" at that point is recorded as the flag value in the interrupt-handler-record table 160 and as the flag value in the flag-management table 150.

As described above, according to the second embodiment, when the target-range-specification interface 220 registers a new information-collection target range in the flag-management table 150, the command rewriting routine 270 analyzes the application program 40, extracts a command transited to the information-collection target range, and rewrites the command such as to call the flag-setting interface 230. Further, the command rewriting routine 270 sets a transition source address, a transition destination address, a transition identification value for identifying the transition, and a target number that corresponds to the flag-management table 150, in the transition-management table 280.

When the flag-setting interface 230 is called, it obtains the target number from the call source address (transition source address) in the transition-management table 280, and stores the transition identification value as the flag value of the target number in the flag-management table 150.

Therefore, there is no need for the user to correct the application program 40 and set the flag value, thereby reducing the burden on the user.

Figure 9:
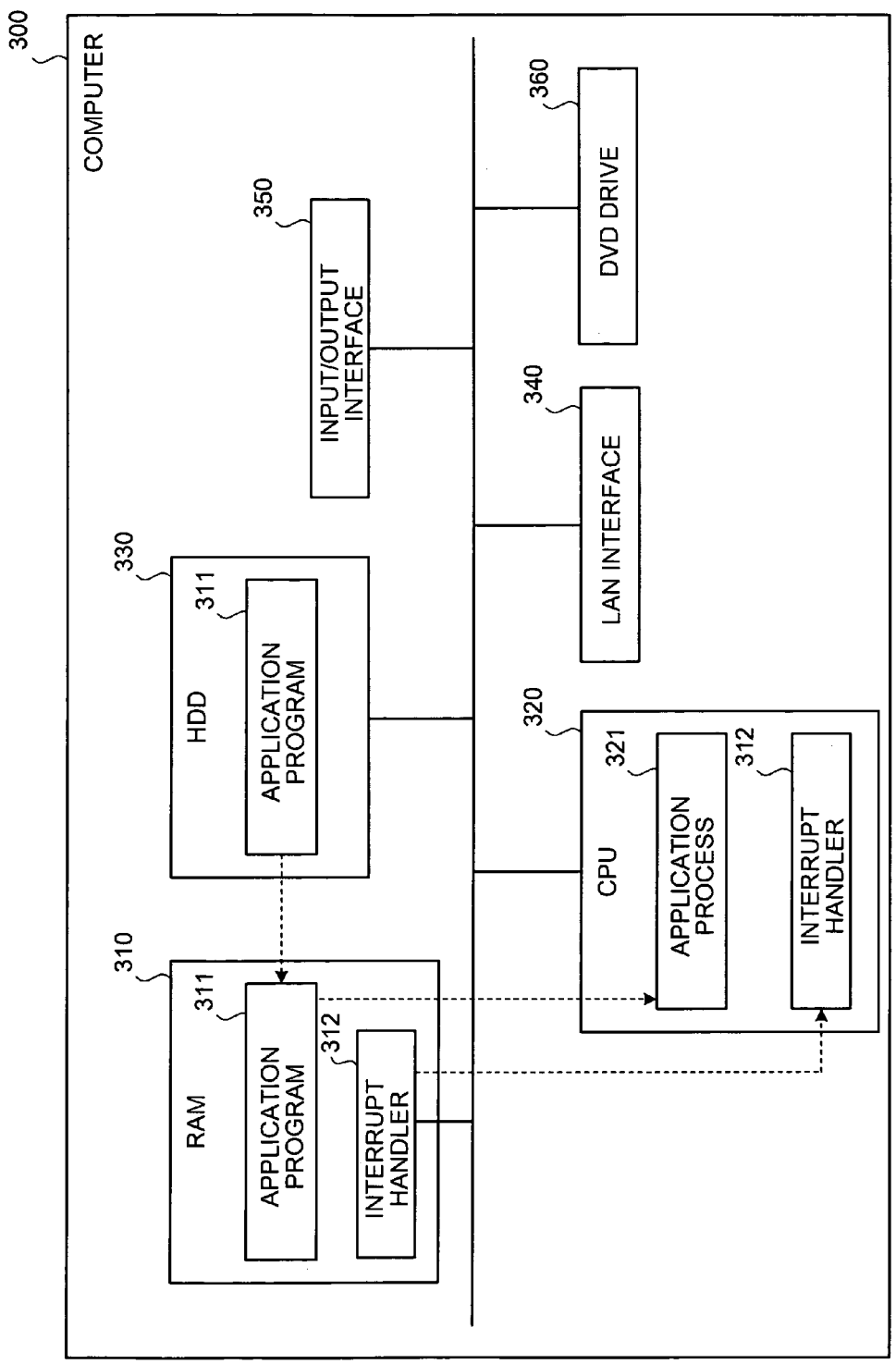
FIG. 9 is a block diagram of a computer that executes a profiling program according to the present invention.
Figure 10A:
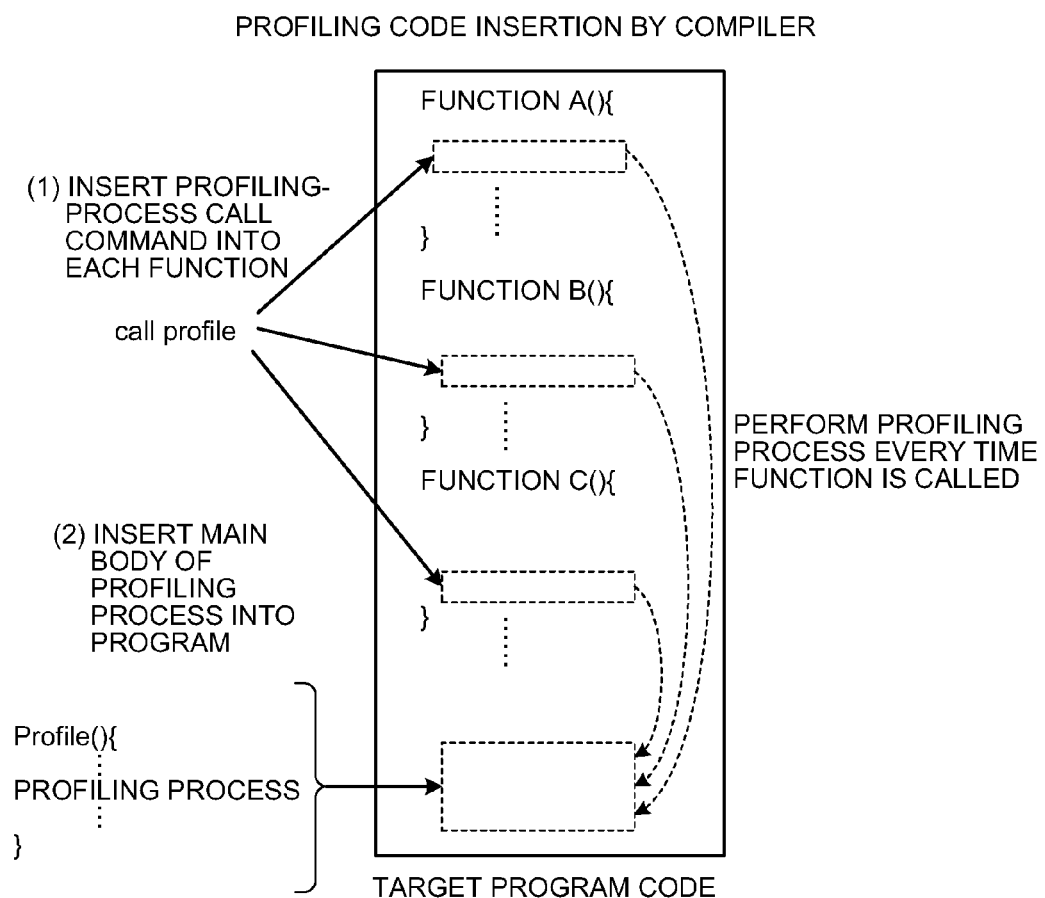
FIGS. 10A and 10B are schematics for illustrating a conventional profiling method.
Figure 10B:
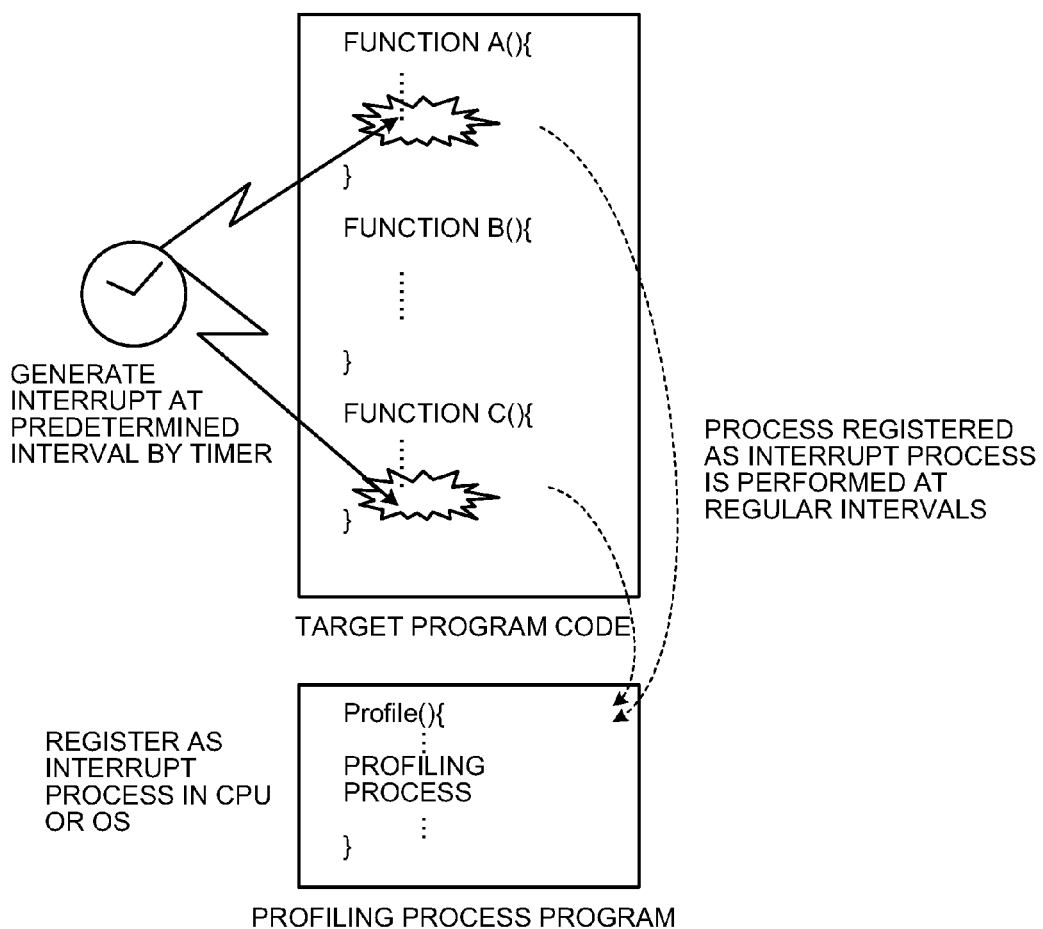

FIG. 9 is a block diagram of a computer 300 that executes a profiling program according to the present invention.

Since the section of each profiling program excluding the interrupt handler is executed as a library function as one part of an application program, it is assumed herein that the computer 300 executes an application program 311 and an interrupt handler 312. The computer 300 corresponds to the computer hardware 10 shown in FIG. 1.

As shown in FIG. 9, the computer 300 includes a random access memory. (RAM) 310, a CPU 320, a hard disk drive (HDD) 330, a local area network (LAN) interface 340, an input/output interface 350, and a digital versatile disk (DVD) drive 360.

The RAM 310 stores programs, results obtained while these programs are being executed, and the like. The CPU 320 reads programs from the RAM 310 and executes them.

The HDD 330 is a disk apparatus that stores programs and data. The LAN interface 340 connects the computer 300 to other computers via a LAN.

The input/output interface 350 connects to input devices such as a mouse and a keyboard, and a display device. The DVD drive 360 reads and writes from and to DVDs.

The application program 311 executed in the computer 300 is stored in the HDD 330 after being compiled, read into the RAM 310, and executed by the CPU 320 as an application process 321. When the interrupt handler 312 is registered as an interrupt processing program, it is stored in the RAM 310, and this interrupt processing program is executed by the CPU 320 when a sampling interrupt is generated.

According to an embodiment of the present invention, path information, variable information, and the like can be collected by setting these pieces of information. Therefore, detailed information such as path information and variable information can be collected with a low overhead.

Furthermore, according to an embodiment of the present invention, since necessary initialization processing is performed, profiling can be performed easily.

Moreover, according to an embodiment of the present invention, since information relating to execution transition is collected automatically, the burden on the user can be reduced.

Furthermore, according to an embodiment of the present invention, since information relating to execution transition is collected by transition identifiers, an interrupt handler can collect information speedily.

Moreover, according to an embodiment of the present invention, since a transition source transited into an information-collection target range can be identified, analysis can be facilitated.

Furthermore, according to an embodiment of the present invention, since various path information is collected by changing specifications of stage numbers, analysis can be facilitated.

Moreover, according to an embodiment of the present invention, since the relationship between set information and an execution position can be obtained, analysis can be facilitated.

Furthermore, according to an embodiment of the present invention, since information relating to a call relationship of functions is collected, analysis of the call relationship of functions can be facilitated.

Moreover, according to an embodiment of the present invention, since various pieces of information are collected, analysis can be facilitated.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium storing therein a computer program for collecting information on an execution status of an information-collection target program with an interrupt handler that is activated by an interrupt generated when a predetermined condition is satisfied, wherein
    the computer program causes a computer to execute:
        specifying a target range for collecting the information on the execution status with the interrupt handler, the collecting being executed when the interrupt is generated within the target range;
        setting a flag value as information to be collected by the interrupt handler when the interrupt is generated within the target range, the flag value specifying a path of a function call generated within the target range;
        registering, in a flag-management table for each target range, a correspondence relation among a target number for identifying the target range, a start address of the target range, an end address of the target range, and the flag value; and
        storing, in an interrupt-handler-record table, a correspondence relation among the flag value and an execution address of the computer program for collecting information at an interrupt time when the interrupt is generated within the target range.

2. The computer-readable, non-transitory medium according to claim 1, wherein
    the computer program further causes the computer to execute:
        initial processing including requesting an operating system for setting of the predetermined condition and registering of the interrupt handler.

3. The computer-readable, non-transitory medium according to claim 1, wherein
    the computer program further causes the computer to execute:
        function replacing including
            detecting a function call transited to the target range from the information-collection target program;
            replacing the function call detected at the detecting with a call for the setting; and
            recording information on an execution transition by the function call, and
        the setting includes setting a part of the information on the execution transition recorded at the recording as the information to be collected.

4. The computer-readable, non-transitory medium according to claim 3, wherein
    the recording includes recording a transition identifier for identifying each transition as the part of the information on the execution transition, and
    the setting includes setting the transition identifier recorded at the recording as the information to be collected.

5. The computer-readable, non-transitory medium according to claim 3, wherein
    the recording includes recording information including a transition source address and a transition destination address as the information on the execution transition.

6. The computer-readable, non-transitory medium according to claim 3, wherein
    the detecting includes detecting the function call based on a specified number of stages of function calls until a transition to the target range is completed.

7. The computer-readable, non-transitory medium according to claim 1, wherein
    the information set at the setting is collected with an execution address at a time when the interrupt is generated.

8. The computer-readable, non-transitory medium according to claim 1, wherein
    the specifying includes specifying the target range based on a function name.

9. The computer-readable, non-transitory medium according to claim 1, wherein
    the information set at the setting is formed with a plurality of values, and
    the interrupt handler collects the values.

10. The computer-readable, non-transitory medium according to claim 1, wherein
    the specifying and the setting are performed by a library function called from the information-collection target program by an application program interface.

11. A profiling method of collecting information on an execution status of an information-collection target program with an interrupt handler that is activated by an interrupt generated when a predetermined condition is satisfied, the method comprising:
    specifying a target range for collecting the information on the execution status with the interrupt handler, the collecting being executed when the interrupt is generated within the target range;
    setting a flag value as information to be collected by the interrupt handler when the interrupt is generated within the target range, the flag value specifying a path of a function call generated within the target range;
    registering, in a flag-management table for each target range, a correspondence relation among a target number for identifying the target range, a start address of the target range, an end address of the target range, and the flag value; and
    storing, in an interrupt-handler-record table, a correspondence relation among the flag value and an execution address of the computer program for collecting information at an interrupt time when the interrupt is generated within the target range.

12. The profiling method according to claim 11, further comprising:
   initial processing including
      requesting an operating system for setting of the predetermined condition and registering of the interrupt handler.

13. The profiling method according to claim 11, further comprising:
   function replacing including
      detecting a function call transited to the target range from the information-collection target program;
      replacing the function call detected at the detecting with a call for the setting; and
      recording information on an execution transition by the function call, wherein
   the setting includes setting a part of the information on the execution transition recorded at the recording as the information to be collected.

14. The profiling method according to claim 13, wherein
   the recording includes recording a transition identifier for identifying each transition as the part of the information on the execution transition, and
   the setting includes setting the transition identifier recorded at the recording as the information to be collected.

15. The profiling method according to claim 13, wherein
   the recording includes recording information including a transition source address and a transition destination address as the information on the execution transition.

16. The profiling method according to claim 13, wherein
   the detecting includes detecting the function call based on a specified number of stages of function calls until a transition to the target range is completed.

17. The profiling method according to claim 11, wherein
   the information set at the setting is collected with an execution address at a time when the interrupt is generated.

18. The profiling method according to claim 11, wherein
   the specifying includes specifying the target range based on a function name.

19. The profiling method according to claim 11, wherein
   the information set at the setting is formed with a plurality of values, and
   the interrupt handler collects the values.

20. The profiling method according to claim 11, wherein
   the specifying and the setting are performed by a library function called from the information-collection target program by an application program interface.

* * * * *